June 23, 1925.
A. L. WITHERELL
LIQUID REGISTER
Filed April 7, 1922
1,543,465
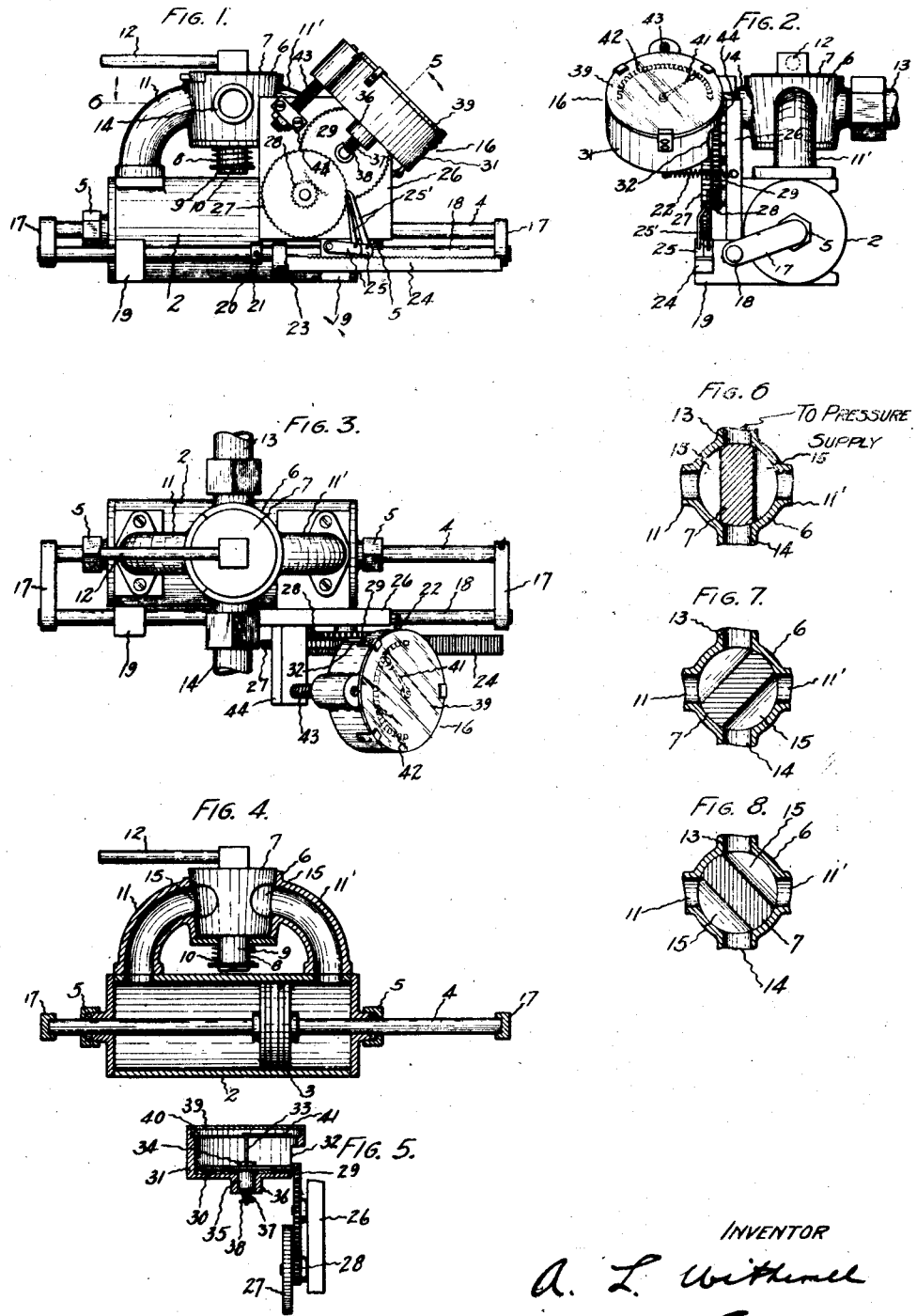
INVENTOR
A. L. Witherell
ATTORNEY Patented June 23, 1925.

1,543,465

UNITED STATES PATENT OFFICE.

ARTHUR L. WITHERELL, OF WETHERSFIELD, CONNECTICUT.

LIQUID REGISTER.

Application filed April 7, 1922. Serial No. 550,300.

*To all whom it may concern:*

Be it known that I, ARTHUR L. WITHERELL, citizen of the United States of America, residing at 55 Church Street, Wethersfield, in the county of Hartford and State of Connecticut, have invented certain new and useful Improvements in Liquid Registers, of which the following is a specification.

This invention relates to liquid registers. An appliance involving the invention may be employed with advantage in widely-different connections although in practice it has been found of especial utility in connection with the dispensing of fluid substances such as grease. The appliance, therefore, is of particular importance when used as an adjunct in a garage or equivalent supply-station. The substance of whatever nature it may be, is discharged generally in a definite quantity which may be either a measure such as a quart or weight as pounds. While the appliance possesses a number of advantages I might mention among those efficiency and accuracy in action and what is of more importance the discharge action on each operation of the appliance that is to say that on each movement of the plunger or equivalent device, the delivery of a quantity of substance, is brought about. In the drawing accompanying and forming part of the present specification I have shown somewhat in detail, one of the widely-different forms of embodiment of the invention which is provided to enable those skilled in the measuring and allied arts to practice the invention. Clearly I am in no sense restricted to this disclosure. I may depart therefrom in many respects within the scope of the invention defined by the claim following said description.

Referring to said drawings:

Fig. 1 is a side elevation of an appliance involving the invention.

Fig. 2 is an elevation as seen from the right in Fig. 1.

Fig. 3 is a top plan view.

Fig. 4 is a practically central vertical section.

Fig. 5 is a transverse sectional view of the indicating portion.

Figs. 6, 7 and 8 are sectional details of valve mechanism, the valve being shown in three different positions.

Like characters refer to like parts throughout the several views.

As may be inferred, the invention involves certain basically new or fundamentally novel relations and I have merely illustrated one of a large number of ways by which the invention can be advantageously practiced being as I have in effect intimated, in no respect restricted thereto. In the form of the invention shown, the article is employed for the delivery of grease, and as I have noted, this may be either by measure or by weight which is ordinarily pounds. The amount dispensed may be determined through an indicating device which ordinarily but not essentially forms a part of the equipment. Usually the grease or equivalent substance, is supplied under pressure by means for instance of a pump.

The appliance involves a measuring chamber and although this may be of any suitable character, a cylinder as 2 meets my requirements in this particular, the cylinder being customarily horizontally placed. The plunger or ejecting device may in like fashion as is the case of the other elements of the appliance, be of any proper nature, although the piston 3 meets my requirements in this regard. The plunger or piston 3 travels or reciprocates in the cylinder 2 and as will be understood ejects on each stroke or movement, and is fastened rigidly to the stem or rod 4 between the ends thereof, the rod projecting through central openings in the heads of the cylinder 2 and by way of stuffing boxes 5.

In the construction shown the plunger or piston 3 is intended for the ejection of the substance on each movement thereof thus making the appliance duplex, suitable valve and supply and discharge mechanism being cooperative with the measuring chamber or cylinder 2 or analogous elements. The means shown for the purpose will be set forth. Above, as shown, the measuring chamber or cylinder 2, is situated the casing 6, which as illustrated is of downwardly tapering form and is intended, as represented, to receive for rocking or oscillatory motion the virtually similarly tapered valve 7, which is held down against the bottom of the casing 6 as by the coil spring 8, surrounding the pendant stem 9 of the valve, which projects through the bottom of the casing, the spring bearing at one end against the under side of the bottom and at the other against a stop such as the pin 10 extending transversely through the lower part of the stem. The spring naturally prevents accidental movement of the valve. From the upper end portions of the valve casing 6 at practically diametrically opposite points lead the pipes or tubes 11 and 11' shown as being longitudinally arched, the opposite ends of the tubes or pipes opening in a liquid and air-tight manner into the chamber or cylinder 2 in proximity to the ends thereof. The pipes 11 and 11' constitute alternately supply or induction and discharge or eduction pipes.

It will be assumed that the plunger or piston 3 is moving toward the right in Fig. 4 so as to expel any substance forward of it through the pipe 11' on the right, in said view. Such substance entering the chamber or cylinder 2 through the pipe 11 on the left it being assumed that the valve 7 is in such position to secure this result. It might be noted that the valve, however, is in the neutral or closed position in Fig. 4. Later I will describe the action of the valve. It may be operated in any proper manner. For instance, its upper end may be furnished with the manipulating handle or crank 12 rigid therewith and which can be operated to rock or turn the valve.

In conjunction with or as a part of the appliance is a source of supply, the substance supplied being generally under pressure. As shown the valve casing 6 has connected therewith the supply pipe 13 for the grease or other substance which is caused to pass thereon and into the valve casing by some kind of pressure supply device, the grease being delivered to the customer for example by way of the discharge pipe 14 leading from the casing 6 vertically diametrically opposite the pipe 13. The axes of these pipes are 90 degrees desirably from the upper ends of the arcuate pipes 11 and 11' hereinbefore described.

It will be clear that desirably the flow of the grease or the substance along the pipe 13 or its equivalent is generally constant and under pressure being controlled by the valve 7 or in some other proper manner. This valve is shown as occupying its neutral or closed position in Fig. 6 and is in its two other positions in Figs. 7 and 8. As represented, the valve practically of two-way type has in its sides and diametrically opposite each other the passages 15. In Figs. 3, 4 and 6 the valve 7 is assumed to be fully closed. Its uncut periphery covering the inner ends of the supply and discharge pipes 13 and 14.

It will be understood that the flow of the substance along the pipe 13 from the source of pressure supply is generally continuous. It will be further supposed that there is a body of substance at for instance the right of the piston 3, that the piston is in its mid position and that some of the substance is desired. In this event the valve 7 will be swung to the position shown in Fig. 7 so that the substance can pass by the valve through the channel or passage 15 on the left in Fig. 7 and Figs. 4, 6 and 8 and entering the pipe 11 will pass from thence into the cylinder 2 at the left and thus force the piston 3 toward the right in Fig. 4 and cause it to eject the substance at its right through the pipe 11' and through the passage 15 Figs. 6, 7, 8 and 4 by way of the pipe 11' and then to the discharge pipe 14 to the place to be furnished with the substance. When the substance at the right of the piston is fully discharged there will be a quantity of the substance at the left of the piston, so that when the valve 7 is moved to the position in Fig. 8 the action described will be exactly reversed.

I provide suitable means by which the amount discharged is indicated usually by a counter such as that denoted in a general way by 16 and hereinafter described in detail although I will set forth the means by which the counter is operated through the primary influence of the plunger or piston 3 and hence by the agency of the relieved substance. To the ends of the piston rod or stem 4, are connected the cross-heads 17, which extend laterally and to the outer ends of which is connected the rod or bar 18 so as to partake of the movements of the piston 3 and also of the rod 4. Generally the cylinder 2 has exteriorly thereof lugs, as 19 through which the rod 18 slides on its opposite movements.

The rod 18 may have a stop 20 attached thereto as by a screw and which is adapted to abut against the lugs, at the ends of the desired strokes of the plunger or piston 3. The stop 20 can be adjusted therefore and can be held in its adjusted position as by the screw 21. This provides a means for varying or regulating the stroke of the piston or plunger. As shown the rod 18 has adjustably fastened thereto the collar 23 and which extends laterally therefrom and to the outer end of which is connected the rack 24, the teeth of which are cooperative with the pawls 25 pivoted to the bearing 26. The pawls 25 in turn have pivoted to them near their noses and on the upper sides thereof, spring pawls 25', cooperative with the teeth of the ratchet wheel 27 rotatively mounted on the bearing 26. Concentric and rigid with the ratchet wheel 27 is the pinion 28 in mesh with the spur gear 29 rotatively mounted on the bearing 26 the lateral upper portion of the spur gear 29 being adapted to frictionally engage the peripheral portion of the disk 30 mounted in the casing 31, supported as hereinafter described and the inner side of which is cut away or slotted as at 32 to permit the engagement in question. Extending centrally through the disk 30 is the spindle 33 which has fastened to it above said disk a collar 34. Desirably the spring 22 functions to hold the spur gear 29 against the friction disk 30. The disk has the central hub 35 through which the spindle loosely passes and which is situated in the depending hub 36 centrally of the under side of the casing 31. The spindle 33 extends slightly below the hub 36, its extended portion having around it the coil spring 37 which acts against the stop 38, as a pin, projecting across the lower end portion of the spindle, the upper end of the spring having a bearing against the hub 35, the spring therefore having a constant tendency to draw the spindle 33 and therefore the collar 34 downwardly and hold it yieldingly against the disk 30. Set into the upper side of the casing 31 is the glass or lens 39 and below the glass or lens is the graduated disk 40. Above the card or disk 40 and fastened to the spindle 33 is the pointer 41.

As the piston 3 reciprocates in the manner hereinbefore described, it acts through the intermediate parts to reciprocate the rack bar 24 and as I have already observed, causes ejection of the substance, but as the rack bar moves, it causes the action of the two pawls 25 and they in turn the pawls 25′ so as to turn the ratchet wheel 27 and the pinion 28. As the pinion 28 rotates, it turns the spur gear 29 and thus effects the turning of the disk 30 and results in the rotation of the spindle 33 and the pointer or index member 41 which traverses the disk or card 39 so that the scale 42 is traversed by the pointer or finger, to positively indicate either by weight or measure the amount of grease discharged. The casing 31 is desirably movably mounted so that is can be adjusted to conform to the adjustments when necessary, in stroke of the piston 3. This adjustment may be effected in various ways for instance by the means shown and now to be set forth: The casing has connected with it, a depending screw 43 threaded through the projection 44 on the bearing or frame member 26, and provides a means for raising or lowering the casing to conform to the adjustments of the corelated parts.

It will be clear also that an indication of a movement of the piston 3 is always measured, regardless of the amount of movement of the piston or analagous part. As a matter of fact, the invention as will be clear comprises certain broad relations and I have disclosed merely one of a large number of different ways by which the invention can be practiced.

It will be clear from the foregoing description, that the appliance comprises a source of supply for the substance which is generally gotten through pressure by reason of which the same is continuously supplied. In addition to this there is means by which the substance is received, the cylinder 2 functioning as such receiving-means, and having therein a piston which functions on each movement thereof, to discharge the material from the cylinder or its equivalent, there being a supply of the material on each action of the supply or ejecting means of whatever nature it may be.

I have mentioned the fact that the stroke of the piston 3, constituting an ejecting device, can be adjusted. A number of advantages are obtained by this adjustment among them being the adaptation of the appliance by reason of such adjustment to conform to the specific gravity of the article to be discharged.

It should be also noted that the collar 34 is rigid with the spindle 33 with which the index finger or pointer 41 is also rigid, the spindle being rotated normally by the action of the friction disk 30 against the collar 34, which is held down against said disk 30 by the spring 37. When, therefore, a quantity of substance has been delivered by the appliance, the pointer 41 indicating the amount delivered on the scale 42, can be lifted by the outward endwise movement of the spindle 33 which carries the collar 34 out of driving engagement with the disk 30 so that the pointer can be set back to zero on the scale 42.

What I claim is:

In a liquid dispensing device having a member arranged to move back and forth as liquid is dispensed, a counter, a rack, means connected to and actuated by said member to reciprocate said rack, a pinion, a ratchet concentric with said pinion, a pair of pawls actuated by said rack, a pair of spring pawls connected respectively with the other pawls for turning said ratchet wheel, a counter and means actuated by the pinion for operating said counter.

In testimony whereof I hereby affix my signature.

ARTHUR L. WITHERELL.

Witnesses:
HEATH SUTHERLAND,
ELIAS C. GARDELL.